A. H. RICHARDSON.
Smelting Furnace.
No. 69,025.
Patented Sept. 17, 1867.
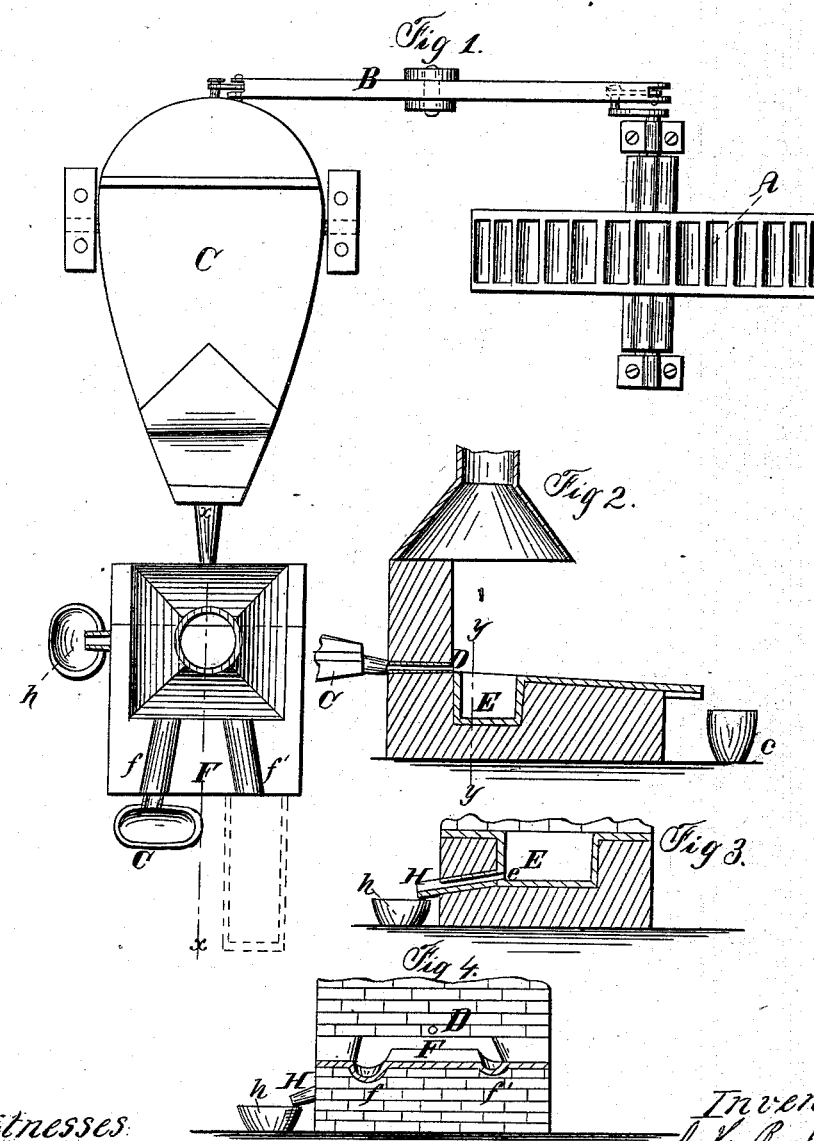

United States Patent Office.

ALFRED H. RICHARDSON, OF DENVER, COLORADO.

Letters Patent No. 69,025, dated September 17, 1867.

IMPROVED FURNACE FOR SMELTING ORES OF SILVER.

*The Schedule referred to in these Letters Patent and making part of the same.*

TO ALL WHOM IT MAY CONCERN:

Be it known that I, A. H. RICHARDSON, of Denver, in the county of Arapahoe, and Territory of Colorado, have invented a new and improved Furnace for Smelting Ores; and I do hereby declare that the following is a full, clear, and exact description thereof, which will enable others skilled in the art to make and use the same, reference being had to the accompanying drawings, forming part of this specification.

This invention relates to an improvement in furnaces for smelting silver. It consists in directing a blast upon the ores treated with charcoal, in a furnace having three apertures at different levels, for the separation of the slag, silver, and lead by gravitation. In the accompanying drawings—

Figure 1 is a top view of my improved smelting-furnace.

Figure 2 is a vertical section thereof through line $x\ x$.

Figure 3 is a like section through the line $y\ y$, and

Figure 4 is a front view.

Similar letters of reference indicate corresponding parts.

A is a water-wheel, or other source of power; B, the working-beam, attached to the bottom lid of the bellows C. D is the fire, of which the blast is directed upon the ores, which, treated with charcoal, are in the furnace-box E. The box E is furnished with an apron, F, having two grooves, $f f'$, at different levels, the slag rising to the top and flowing off at $f'$ into a sluice-box of water, the silver flowing off at $f$ into the pot G. The lead, by its greater gravity, falls through a hole, $c$, at the bottom of the box E, and flows through duct H into the pot $h$.

I assert that by treating the ore with charcoal in the furnace, as above described, the silver and lead are effectually and cheaply separated and the antimony desulphurized.

What I claim as new, and desire to secure by Letters Patent, is—

A smelting-furnace, having the blast supplied upon the ores in a furnace-box, provided with an apron, in manner as above set forth, and furnished with three apertures at different levels, in manner and for the purposes substantially as above set forth and described.

The above specification of my invention signed by me this 27th day of May, 1867.

ALFRED H. RICHARDSON.

Witnesses:
    H. O. WAGONER,
    B. L. FORD.